(12) United States Patent
Wakisaka et al.

(10) Patent No.: US 12,081,068 B2
(45) Date of Patent: Sep. 3, 2024

(54) LAMINATED CORE WITH SOME ELECTRICAL STEEL SHEETS ADHERED WITH ADHESIVE AND SOME ELECTRICAL STEEL SHEETS FIXED TO EACH OTHER

(71) Applicant: NIPPON STEEL CORPORATION, Tokyo (JP)

(72) Inventors: Takeaki Wakisaka, Tokyo (JP); Hiroshi Fujimura, Tokyo (JP); Ryu Hirayama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 137 days.

(21) Appl. No.: 17/291,344

(22) PCT Filed: Dec. 17, 2019

(86) PCT No.: PCT/JP2019/049261
§ 371 (c)(1),
(2) Date: May 5, 2021

(87) PCT Pub. No.: WO2020/129924
PCT Pub. Date: Jun. 25, 2020

(65) Prior Publication Data
US 2022/0006334 A1     Jan. 6, 2022

(30) Foreign Application Priority Data

Dec. 17, 2018   (JP) ................. 2018-235866

(51) Int. Cl.
*H02K 1/14* (2006.01)
*H02K 15/02* (2006.01)

(52) U.S. Cl.
CPC ........... *H02K 1/148* (2013.01); *H02K 15/028* (2013.01); *H02K 2213/03* (2013.01)

(58) Field of Classification Search
CPC ............ H02K 1/14; H02K 1/146; H02K 1/16; H02K 1/08; H02K 1/06; H02K 15/02;
(Continued)

(56) References Cited

U.S. PATENT DOCUMENTS 1,538,196 A * 5/1925 Varley ...................... H02K 1/16
310/216.016
3,386,058 A    5/1968 Michel
(Continued)

FOREIGN PATENT DOCUMENTS

CN        102792556 A    11/2012
EP         3553799 A1    10/2019
(Continued)

OTHER PUBLICATIONS

JP2016167907A English Translation (Year: 2016).*
(Continued)

*Primary Examiner* — Maged M Almawri
(74) *Attorney, Agent, or Firm* — Renner, Otto, Boisselle & Sklar, LLP

(57) ABSTRACT

A laminated core includes a plurality of electrical steel sheets that are stacked on one another. All sets of the electrical steel sheets adjacent to each other in a stacking direction are fixed to each other in the laminated core. Some sets of electrical steel sheets among all sets of the electrical steel sheets are fastened but not adhered to each other, and the remaining sets of electrical steel sheets are adhered but not fastened to each other.

13 Claims, 8 Drawing Sheets

(58) Field of Classification Search
CPC . H02K 15/022; H02K 15/026; H02K 2201/09
USPC ..... 310/216.011–216.019, 216.059, 216.061, 310/216.062, 216.064, 216.065, 216.071, 310/216.073, 216.092, 216.096, 310/216.004–216.097; 29/596, 597
See application file for complete search history.

(56) References Cited

U.S. PATENT DOCUMENTS

| | | | | |
|---|---|---|---|---|
| 4,025,379 | A | | 5/1977 | Whetstone |
| 4,103,195 | A | | 7/1978 | Torossian |
| 4,413,406 | A | | 11/1983 | Bennett |
| 4,616,151 | A | * | 10/1986 | Pryjmak .................. H02K 1/26 310/216.096 |
| 4,700,098 | A | * | 10/1987 | Kawashima ........... H02K 21/22 310/156.45 |
| 4,847,526 | A | * | 7/1989 | Takehara ............... H02K 23/40 310/154.25 |
| 5,107,159 | A | * | 4/1992 | Kordik .................. H02K 1/146 318/400.29 |
| 5,142,178 | A | * | 8/1992 | Kloster .................. H02K 1/26 310/216.048 |
| 5,248,405 | A | | 9/1993 | Kaneda et al. |
| 5,331,245 | A | * | 7/1994 | Burgbacher ........... H02K 29/03 310/216.057 |
| 5,338,996 | A | * | 8/1994 | Yamamoto ............. H02K 1/26 336/234 |
| 5,448,119 | A | * | 9/1995 | Kono ...................... H02K 7/14 310/90 |
| 5,477,096 | A | * | 12/1995 | Sakashita ................ H02K 1/06 310/216.016 |
| 5,778,703 | A | * | 7/1998 | Imai ....................... D06F 34/10 68/12.02 |
| 5,986,377 | A | * | 11/1999 | Yamada ................. H02K 15/06 310/216.013 |
| 5,994,464 | A | | 11/1999 | Ohsawa et al. |
| 6,242,835 | B1 | * | 6/2001 | Uemura ................. H02K 3/493 310/214 |
| 6,424,073 | B1 | * | 7/2002 | Kometani ............... H02K 1/16 310/263 |
| 6,433,456 | B1 | * | 8/2002 | Higashino .............. H02K 1/16 310/263 |
| 6,495,936 | B2 | * | 12/2002 | Kikuchi ................. H02K 9/197 310/58 |
| 6,653,758 | B2 | * | 11/2003 | Tsuneyoshi ............ H02K 9/197 310/216.014 |
| 6,774,520 | B2 | * | 8/2004 | Wauke ................... H02K 7/09 310/40 MM |
| 6,885,127 | B1 | * | 4/2005 | Higashino .............. H02K 1/165 310/263 |
| 6,919,663 | B2 | * | 7/2005 | Iles-Klumpner ....... H02K 1/276 310/156.01 |
| 7,298,064 | B2 | | 11/2007 | Yamamoto |
| 7,562,439 | B2 | | 7/2009 | Yamamoto |
| 7,859,163 | B2 | * | 12/2010 | Bertocchi ........... H01F 41/0233 310/216.048 |
| 7,952,254 | B2 | * | 5/2011 | Cho ....................... H02K 3/345 310/216.118 |
| 8,015,691 | B2 | | 9/2011 | Miyake |
| 8,274,182 | B2 | * | 9/2012 | Nakayama ............. H02K 41/03 310/216.096 |
| 8,580,217 | B2 | | 11/2013 | Hipszki et al. |
| 8,581,468 | B2 | * | 11/2013 | Kudose .................. H02K 1/16 310/216.049 |
| 8,697,811 | B2 | | 4/2014 | Kishi et al. |
| 8,847,460 | B2 | * | 9/2014 | Jurkovic ................ H02K 29/03 310/216.096 |
| 8,943,677 | B2 | | 2/2015 | Gerster et al. |
| 9,331,530 | B2 | * | 5/2016 | Jang ...................... H02K 1/146 |
| 9,512,335 | B2 | | 12/2016 | Hoshi et al. |
| 9,685,264 | B2 | * | 6/2017 | Neuenschwander .. H02K 1/165 |
| 9,770,949 | B2 | | 9/2017 | Fudemoto et al. |
| 9,833,972 | B2 | | 12/2017 | Ohishi et al. |
| 10,340,754 | B2 | * | 7/2019 | Ogino et al. |
| 10,348,170 | B2 | * | 7/2019 | Izumi ................... H02K 15/024 |
| 10,476,321 | B2 | * | 11/2019 | Li ........................ H02K 15/026 |
| 10,491,059 | B2 | * | 11/2019 | Murakami ............. H02K 1/185 |
| 10,547,225 | B2 | * | 1/2020 | Hattori .................. H02K 1/185 |
| 10,574,112 | B2 | * | 2/2020 | Tomonaga .............. H02K 1/02 |
| 10,819,201 | B2 | * | 10/2020 | Thumm ................. H02K 17/20 |
| 10,840,749 | B2 | * | 11/2020 | Chaillou ............... H02K 15/085 |
| 11,056,934 | B2 | * | 7/2021 | Kubota .................. H02K 1/165 |
| 11,616,407 | B2 | * | 3/2023 | Hino ..................... H02K 1/165 310/216.007 |
| 11,973,369 | B2 | * | 4/2024 | Fujimura ............... H02K 1/146 |
| 2002/0047459 | A1 | * | 4/2002 | Adaeda ................ H02K 21/222 310/216.048 |
| 2002/0075121 | A1 | * | 6/2002 | Akita .................... H02K 1/148 336/234 |
| 2002/0163277 | A1 | * | 11/2002 | Miyake ................ H02K 15/022 310/216.001 |
| 2004/0056556 | A1 | * | 3/2004 | Fujita ................... H02K 15/022 29/609 |
| 2004/0124733 | A1 | * | 7/2004 | Yamamoto ............. B29C 70/72 29/596 |
| 2006/0043820 | A1 | * | 3/2006 | Nakahara ................ H02K 1/02 310/254.1 |
| 2007/0018529 | A1 | * | 1/2007 | Naitou ................... A61G 5/045 310/43 |
| 2007/0024148 | A1 | * | 2/2007 | Maita .................. H02K 23/405 310/216.011 |
| 2007/0040467 | A1 | * | 2/2007 | Gu ........................ H02K 3/522 310/260 |
| 2007/0182268 | A1 | * | 8/2007 | Hashiba ................ H02K 1/146 310/67 R |
| 2009/0026873 | A1 | * | 1/2009 | Matsuo ................ H02K 15/022 310/216.019 |
| 2009/0195110 | A1 | | 8/2009 | Miyaki |
| 2009/0230812 | A1 | * | 9/2009 | Cho ...................... H02K 3/325 310/216.118 |
| 2010/0090560 | A1 | * | 4/2010 | Myojin ................. H02K 15/02 310/216.043 |
| 2010/0127593 | A1 | * | 5/2010 | Qin ...................... H02K 1/265 310/216.112 |
| 2010/0197830 | A1 | | 8/2010 | Hayakawa et al. |
| 2010/0219714 | A1 | * | 9/2010 | Abe ...................... H02K 1/146 310/216.048 |
| 2010/0244617 | A1 | * | 9/2010 | Nobata .................. H02K 3/50 310/216.069 |
| 2011/0169369 | A1 | * | 7/2011 | Liang .................... H02K 1/16 310/216.092 |
| 2011/0180216 | A1 | | 7/2011 | Miyake |
| 2011/0269894 | A1 | | 11/2011 | Miyamoto |
| 2012/0088096 | A1 | | 4/2012 | Takeda et al. |
| 2012/0128926 | A1 | | 5/2012 | Ohishi et al. |
| 2012/0156441 | A1 | | 6/2012 | Gerster |
| 2012/0235535 | A1 | | 9/2012 | Watanabe |
| 2012/0288659 | A1 | | 11/2012 | Hoshi et al. |
| 2013/0244029 | A1 | | 9/2013 | Igarashi et al. |
| 2014/0023825 | A1 | | 1/2014 | Igarashi et al. |
| 2015/0028717 | A1 | | 1/2015 | Luo et al. |
| 2015/0097463 | A1 | | 4/2015 | Blocher et al. |
| 2015/0130318 | A1 | | 5/2015 | Kitada et al. |
| 2015/0256037 | A1 | * | 9/2015 | Kudose .................. H02K 3/30 310/45 |
| 2015/0337106 | A1 | | 11/2015 | Kajihara |
| 2016/0023447 | A1 | * | 1/2016 | Shimizu ................ H02K 15/02 156/247 |
| 2016/0352159 | A1 | * | 12/2016 | Li ........................ H02K 1/146 |
| 2016/0352165 | A1 | * | 12/2016 | Fubuki .................. H02K 1/22 |
| 2017/0117758 | A1 | | 4/2017 | Nakagawa |
| 2017/0287625 | A1 | | 10/2017 | Ito |
| 2017/0342519 | A1 | | 11/2017 | Uesaka et al. |
| 2017/0368590 | A1 | | 12/2017 | Senda et al. |
| 2018/0026501 | A1 | * | 1/2018 | Ogikubo ............. H02K 15/022 29/596 |
| 2018/0030292 | A1 | | 2/2018 | Gotou |
| 2018/0056629 | A1 | * | 3/2018 | Hamamura .......... H02K 15/024 |
| 2018/0134926 | A1 | | 5/2018 | Lei et al. |
| 2018/0159389 | A1 | | 6/2018 | Nishikawa |

(56) References Cited

U.S. PATENT DOCUMENTS

| | | | |
|---|---|---|---|
| 2018/0212482 A1* | 7/2018 | Nigo | H02K 7/14 |
| 2018/0248420 A1 | 8/2018 | Enokizono et al. | |
| 2018/0295678 A1 | 10/2018 | Okazaki et al. | |
| 2018/0309330 A1 | 10/2018 | Ueda | |
| 2018/0342925 A1 | 11/2018 | Horii et al. | |
| 2019/0010361 A1* | 1/2019 | Hoshi | C09J 163/00 |
| 2019/0040183 A1 | 2/2019 | Yoshida et al. | |
| 2020/0048499 A1 | 2/2020 | Andou et al. | |
| 2020/0099263 A1 | 3/2020 | Hirosawa et al. | |
| 2020/0186014 A1* | 6/2020 | Kusuyama | B21D 37/18 |
| 2021/0296975 A1* | 9/2021 | Hino | H02K 15/02 |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 62-009951 A | 1/1987 |
| JP | 63-207639 A | 8/1988 |
| JP | 01-168777 A | 7/1989 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018-138634 A | 9/2018 |
| JP | 2018-145492 A | 9/2018 |
| KR | 10-2017-0087915 A | 7/2017 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Matweb, "Plaskolite West Optix® CA-41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

Japanese Industrial Standard (JIS) C 2552: 2014, relevance discussed in specification.

Japanese Industrial Standard (JIS) C 2553: 2012, relevance discussed in specification.

(56) References Cited

OTHER PUBLICATIONS

Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan, RM-92-79, 1992.
Datasheet of Nylon 6, Cast (Year: N/A, Printed Jun. 28, 2023).

* cited by examiner

US 12,081,068 B2

LAMINATED CORE WITH SOME ELECTRICAL STEEL SHEETS ADHERED WITH ADHESIVE AND SOME ELECTRICAL STEEL SHEETS FIXED TO EACH OTHER

TECHNICAL FIELD

The present invention relates to a laminated core and an electric motor.

Priority is claimed on Japanese Patent Application No. 2018-235866, filed Dec. 17, 2018, the content of which is incorporated herein by reference.

BACKGROUND ART

In the related art, a laminated core as disclosed in the following Patent Document 1 is known. In this laminated core, electrical steel sheets adjacent to each other in a stacking direction are bonded by both methods of adhesion and fastening.

CITATION LIST

Patent Document

[Patent Document 1]
Japanese Unexamined Patent Application, First Publication No. 2015-136228

SUMMARY OF THE INVENTION

Problems to be Solved by the Invention

In the laminated core in the related art, there is room for the improvement in ensuring dimensional accuracy of an external shape and improving magnetic properties.

The present invention has been made in consideration of the circumstances described above, and an object thereof is to ensure dimensional accuracy of an external shape and improve magnetic properties.

Means for Solving the Problem

In order to solve the problems, the present invention proposes the following aspects.

(1) According to a first aspect of the present invention, there is provided a laminated core including a plurality of electrical steel sheets that are stacked on one another. All sets of the electrical steel sheets adjacent to each other in a stacking direction are fixed to each other in the laminated core. Some sets of electrical steel sheets among all sets of the electrical steel sheets are fastened but not adhered to each other, and the remaining sets of electrical steel sheets are adhered but not fastened to each other.

In bonding by fastening, compared to bonding by adhesion, dimensional accuracy can be enhanced. Here, some sets of electrical steel sheets among all sets of the electrical steel sheets adjacent to each other in the stacking direction are fastened. Therefore, in the laminated core, accuracy of the shapes of portions formed by some sets thereof can be enhanced. As a result, accuracy of the external shape of the laminated core can be enhanced. Thus, handling properties of the laminated core can be ensured. For example, even when a winding is wound around the laminated core, winding or the like can be accurately performed.

However, in bonding by fastening, there is concern that a short circuit current (stray current) may be generated between electrical steel sheets adjacent to each other in the stacking direction. Here, the remaining sets of the electrical steel sheets among all sets of the electrical steel sheets adjacent to each other in the stacking direction excluding some sets thereof are adhered to each other. Therefore, generation of a stray current can be curbed between the electrical steel sheets of the remaining sets. As a result, magnetic properties of the laminated core can be improved.

(2) In the laminated core according to the (1), the plurality of electrical steel sheets may be adhered every other or more sets in the stacking direction.

The plurality of electrical steel sheets are adhered every other or more sets in the stacking direction. Therefore, local concentration of electrical steel sheets bonded by adhesion in one portion of the laminated core in the stacking direction can be curbed. In other words, electrical steel sheets bonded by adhesion can be dispersed in the stacking direction. As a result, accuracy of the external shape of the laminated core can be further enhanced.

(3) In the laminated core according to the (1) or the (2), the plurality of electrical steel sheets may be adhered every prime-numbered sets in the stacking direction.

Similar to ordinary products, the laminated core also has a unique resonance frequency. If the resonance frequency of the laminated core is low, resonance is likely to occur when an ordinary vibration is input. For this reason, it is preferable that the resonance frequency of the laminated core be high.

Here, when the plurality of electrical steel sheets are adhered every N sets in the stacking direction, the resonance frequency of the laminated core tends to depend on N.

That is, when they are adhered every N sets, (N+1) electrical steel sheets are disposed between adhesion parts adjacent to each other in the stacking direction, and these electrical steel sheets am fastened to each other. When a bonding strength of the adhesion parts is lower than a bonding strength of fastening, the (N+1) electrical steel sheets are likely to integrally behave with the adhesion parts as starting points. In other words, the (N+1) electrical steel sheets behave as if they were one block. In such a laminated core, when the plurality of electrical steel sheets are adhered every N sets at equal intervals in the stacking direction, the resonance frequency of the laminated core is affected by a divisor of N. In addition, when the plurality of electrical steel sheets are adhered every N1 sets, every N2 sets, and so on in the stacking direction in a manner of being different from each other, the resonance frequency of the laminated core is affected by the least common multiple of N1, N2, and so on. The larger the divisor or the least common multiple, the higher the resonance frequency of the laminated core.

The plurality of electrical steel sheets are adhered every prime-numbered sets in the stacking direction. For this reason, even when the plurality of electrical steel sheets are adhered every N sets (however, N is a prime number) at equal intervals in the stacking direction. N is a prime number, and thus the divisor can be increased. Moreover, also when the plurality of electrical steel sheets are adhered every N1 sets, every N2 sets, and so on in the stacking direction in a manner of being different from each other, the least common multiple of N1, N2, and so on can be increased. Therefore, the resonance frequency of the laminated core can be increased. As a result, for example, the resonance frequency can become a frequency higher than that in an audible range. Accordingly, for example, even when this laminated core is applied to a motor, occurrence of noise due to resonance can be curbed.

(4) In the laminated core according to any one of the (1) to the (3), portions adhered to each other every different numbered sets in the stacking direction may be present in a mixed manner in the plurality of electrical steel sheets.

Portions adhered to each other every different numbered sets in the stacking direction are present in a mixed manner in the plurality of electrical steel sheets. For this reason, when the plurality of electrical steel sheets are adhered every N1 sets, every N2 sets, and so on in the stacking direction in a manner of being different from each other, the least common multiple of N1, N2, and so on can be increased. Therefore, the resonance frequency of the laminated core can be increased in accordance with the least common multiple of the numbers of sets thereof. Accordingly, occurrence of noise due to resonance can be further curbed.

Such operational effects are noticeably exhibited when they are adhered to each other every different prime-numbered sets in the stacking direction. That is, in this case, the least common multiple can be increased.

(5) In the laminated core according to any one of the (1) to the (4), the electrical steel sheets may include an annular core back part and a plurality of tooth parts protruding in a radial direction of the core back part from the core back part and disposed at intervals in a circumferential direction of the core back part.

The laminated core is a stator core including a core back part and tooth parts. For this reason, for example, when a winding is caused to pass through a slot between tooth parts adjacent to each other in the circumferential direction, operational effects of ensuring handling properties described above are noticeably exhibited. That is, if the dimensional accuracy of the slot is increased, the winding can be easily wound around the tooth parts as it is designed. Accordingly, a winding space factor in the slot can be enhanced. As a result, an electric loading inside the slot can be enhanced.

(6) In the laminated core according to any one of the (1) to the (5), an average thickness of the adhesion part may be within a range of 1.0 μm to 3.0 μm.

(7) In the laminated core according to any one of the (1) to the (6), an average tensile modulus of elasticity E of the adhesion part may be within a range of 1,500 MPa to 4,500 MPa.

(8) In the laminated core according to any one of the (1) to the (7), the adhesion part may be a room temperature adhesion type acrylic-based adhesive including an SGA including an elastomer-containing acrylic-based adhesive.

(9) According to a second aspect of the present invention, there is provided an electric motor including the laminated core according to any one of the (1) to the (8).

Effects of the Invention

According to the present invention, dimensional accuracy of an external shape can be ensured and magnetic properties can be improved.

EMBODIMENTS FOR IMPLEMENTING THE INVENTION

Hereinafter, an electric motor according to an embodiment of the present invention will be described with reference to the drawings. In the present embodiment, a motor, specifically an AC motor, more specifically a synchronous motor, and further specifically a permanent magnetic electric motor will be described as an example of an electric motor. For example, motors of these kinds are favorably employed in electric automobiles and the like.

Figure 1:
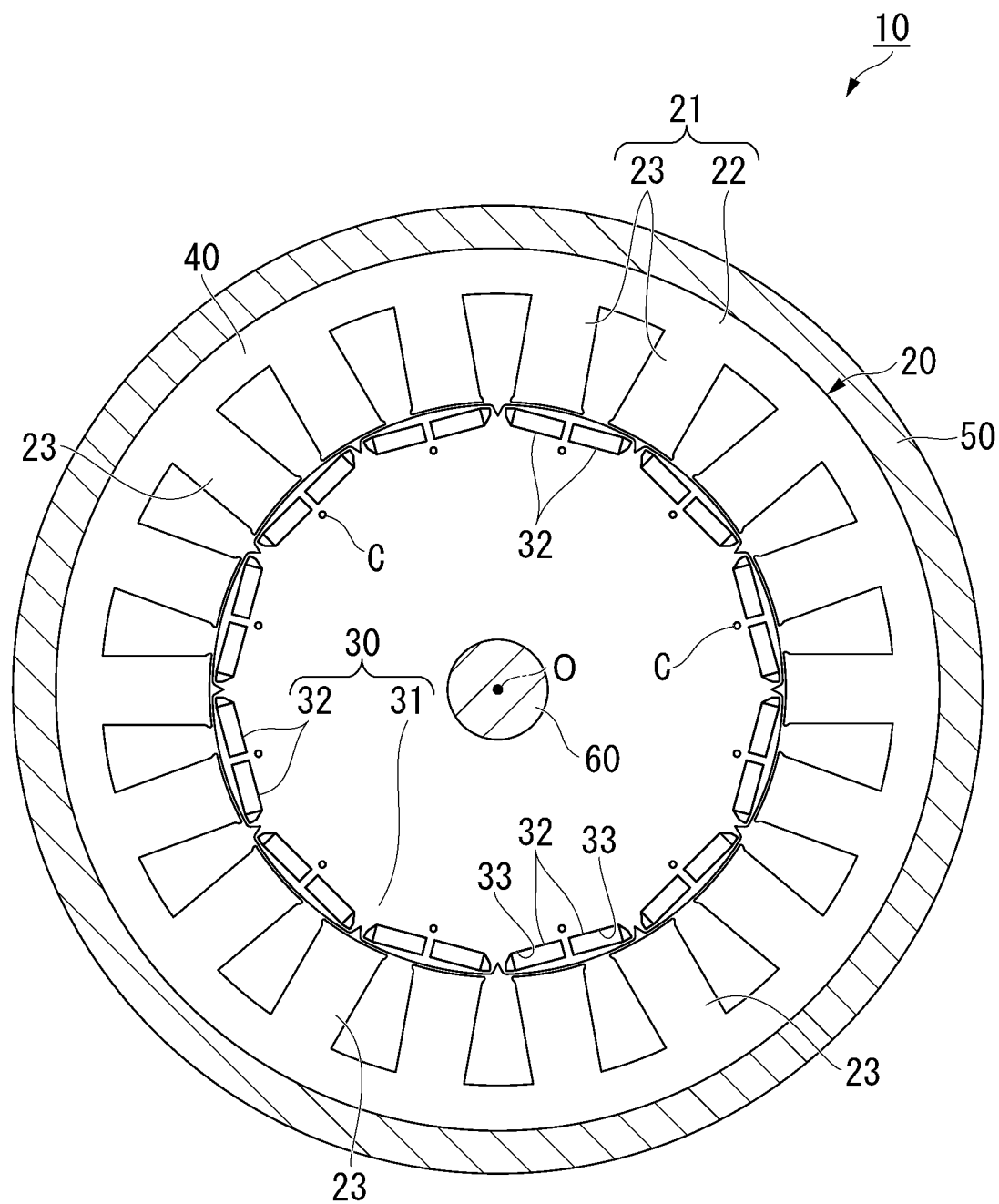
FIG. 1 is a cross-sectional view of an electric motor according to an embodiment of the present invention.
Figure 2:
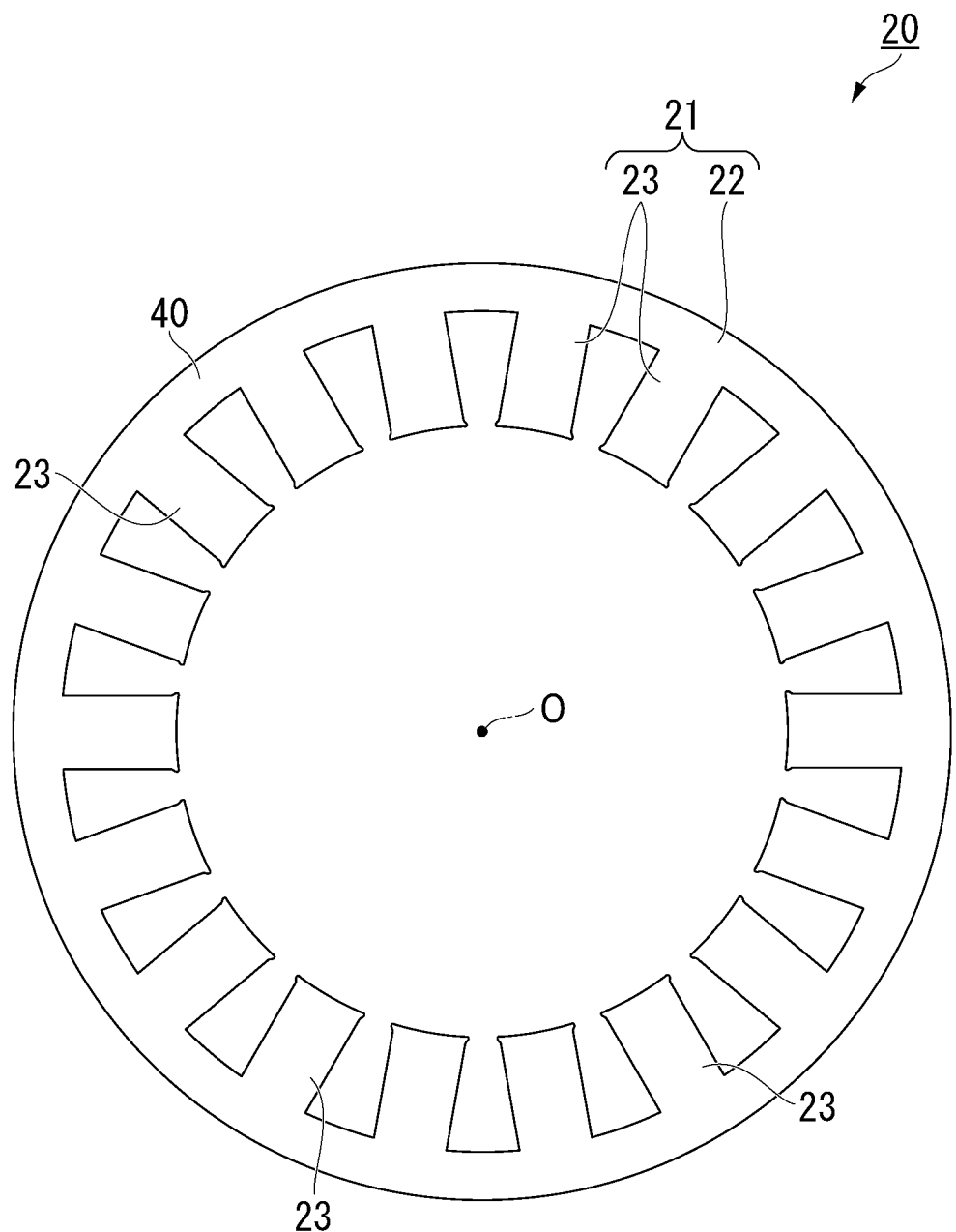
FIG. 2 is a plan view of a stator included in the electric motor illustrated in FIG. 1.

As illustrated in FIGS. 1 and 2, an electric motor 10 includes a stator 20, a rotor 30, a case 50, and a rotary shaft 60. The stator 20 and the rotor 30 are accommodated in the case 50. The stator 20 is fixed to the case 50.

In the present embodiment, an inner rotor type motor in which the rotor 30 is positioned on an inward side of the stator 20 is employed as the electric motor 10. However, an outer rotor type motor in which the rotor 30 is positioned on an outward side of the stator 20 may be employed as the electric motor 10. In addition, in the present embodiment, the electric motor 10 is a three-phase AC motor having 12 poles and 18 slots. However, for example, the number of poles, the number of slots, the number of phases, and the like can be suitably changed. For example, this electric motor 10 can be rotated at a rotation speed of 1,000 rpm by applying an excitation current having an effective value 10A and a frequency of 100 Hz to each phase.

The stator 20 includes a stator core 21 and a winding (not illustrated).

The stator core 21 includes an annular core back part 22 and a plurality of tooth parts 23. Hereinafter, an axial direction (a direction of a center axis O of the stator core 21) of the stator core 21 (the core back part 22) will be referred to as an axial direction. A radial direction (a direction orthogonal to the center axis O of the stator core 21) of the stator core 21 (the core back part 22) will be referred to as a radial direction. A circumferential direction (an orbit direction around the center axis O of the stator core 21) of the stator core 21 (the core back part 22) will be referred to as a circumferential direction.

The core back part 22 is formed to have an annular ring shape in a plan view in which the stator 20 is viewed in the axial direction.

The plurality of tooth parts 23 protrude inward in the radial direction (toward the center axis O of the core back part 22 in the radial direction) from the core back part 22. The plurality of tooth parts 23 are disposed at equal intervals in the circumferential direction. In the present embodiment, 18 tooth parts 23 are provided every 20 degrees of a central angle centering on the center axis O. The plurality of tooth parts 23 are formed to have shapes and sizes equivalent to each other. For example, for the purpose of reducing a cogging torque, the shapes and the sizes of the plurality of tooth parts 23 may not be equivalent to each other.

The winding is wound around the tooth parts 23. The winding may be subjected to concentrated winding or may be subjected to distributed winding.

The rotor 30 is disposed on an inward side in the radial direction with respect to the stator 20 (the stator core 21). The rotor 30 includes a rotor core 31 and a plurality of permanent magnets 32.

The rotor core 31 is formed to have an annular shape (an annular ring shape) coaxially disposed with the stator 20. The rotary shaft 60 is disposed inside the rotor core 31. The rotary shaft 60 is fixed to the rotor core 31.

The plurality of permanent magnets 32 are fixed to the rotor core 31. In the present embodiment, two permanent magnets 32 in one set form one magnetic pole. The plurality of sets of the permanent magnets 32 of are disposed at equal intervals in the circumferential direction. In the present embodiment, 12 sets (24 in total) of the permanent magnets 32 are provided every 30 degrees of the central angle centering on the center axis O. For example, for the purpose of reducing a cogging torque, the intervals between the permanent magnets 32 of a plurality of sets may not be equivalent to each other.

In the present embodiment, an interior permanent magnet motor is employed as a permanent magnetic electric motor. A plurality of through holes 33 penetrating the rotor core 31 in the axial direction are formed in the rotor core 31. The plurality of through holes 33 are provided in a manner of corresponding to the plurality of permanent magnets 32. Each of the permanent magnets 32 is fixed to the rotor core 31 in a state of being disposed inside the corresponding through hole 33. For example, fixing of each of the permanent magnets 32 to the rotor core 31 can be realized through adhesion or the like between outer surfaces of the permanent magnets 32 and inner surfaces of the through holes 33 using an adhesive. A surface permanent magnet motor may be employed as a permanent magnetic electric motor in place of an interior permanent magnet motor.

Both the stator core 21 and the rotor core 31 are laminated cores. The laminated core is formed by stacking a plurality of electrical steel sheets 40.

A stacking thickness of each of the stator core 21 and the rotor core 31 is set to 50.0 mm, for example. An outer diameter of the stator core 21 is set to 250.0 mm, for example. An inner diameter of the stator core 21 is set to 165.0 mm, for example. An outer diameter of the rotor core 31 is set to 163.0 mm, for example. An inner diameter of the rotor core 31 is set to 30.0 mm, for example. However, these values are examples, and the stacking thickness, the outer diameter, and the inner diameter of the stator core 21 and the stacking thickness, the outer diameter, and the inner diameter of the rotor core 31 are not limited to these values. Here, the inner diameter of the stator core 21 is based on tip parts of the tooth parts 23 in the stator core 21. The inner diameter of the stator core 21 is a diameter of an imaginary circle inscribed in the tip parts of all the tooth parts 23.

For example, each of the electrical steel sheets 40 forming the stator core 21 and the rotor core 31 is formed by performing punching or the like of an electrical steel sheet (base material). Known electrical steel sheets can be used as the electrical steel sheets 40. A chemical composition of the electrical steel sheets 40 is not particularly limited. In the present embodiment, non-grain-oriented electrical steel sheets are employed as the electrical steel sheets 40. For example, non-grain-oriented electrical steel strips of JIS C 2552:2014 can be employed as non-grain-oriented electrical steel sheets. However, grain-oriented electrical steel sheets can also be employed as the electrical steel sheets 40 in place of non-grain-oriented electrical steel sheets. For example, grain-oriented electrical steel strips of JIS C 2553:2012 can be employed as grain-oriented electrical steel sheets.

In order to achieve the improvement in workability of the electrical steel sheets and an iron loss of the laminated core, an insulation coating is provided on both surfaces of the electrical steel sheets 40. For example, (1) an inorganic compound, (2) an organic resin, (3) a mixture of an inorganic compound and an organic resin, or the like can be selected as a substance constituting the insulation coating. Examples of an inorganic compound include (1) a complex of dichromate and boric acid, and (2) a complex of phosphate and silica. Examples of an organic resin include an epoxy-based resin, an acrylic-based resin, an acrylic-styrene-based resin, a polyester-based resin, a silicone-based resin, and a fluorine-based resin.

In order to ensure insulating performance between the electrical steel sheets 40 stacked on one another, it is preferable that a thickness of the insulation coating (thickness for one surface of the electrical steel sheet 40) be 0.1 pin or larger.

On the other hand, an insulating effect saturates as the insulation coating becomes thicker. In addition, a space factor decreases and a performance as a laminated core deteriorates as the insulation coating becomes thicker. Therefore, it is better for the insulation coating to be thin to an extent that the insulating performance can be ensured. The thickness of the insulation coating (thickness for one surface of the electrical steel sheet 40) is preferably within a range of 0.1 $\mu$m to 5 $\mu$m and more preferably within a range of 0.1 $\mu$m to 2 $\mu$m.

An effect of achieving the improvement in an iron loss gradually saturates as the electrical steel sheets 40 become thin. In addition, manufacturing costs of the electrical steel sheets 40 increase as the electrical steel sheets 40 become thin. For this reason, in consideration of the effect of achieving the improvement in an iron loss and the manufacturing costs, it is preferable that the thicknesses of the electrical steel sheets 40 be 0.10 mm or larger.

On the other hand, if the electrical steel sheets 40 are excessively thick, it is difficult to perform press punching work of the electrical steel sheets 40. For this reason, in consideration of press punching work of the electrical steel sheets 40, it is preferable that the thicknesses of the electrical steel sheets 40 be 0.65 mm or smaller.

In addition, if the electrical steel sheets 40 become thick, an iron loss increases. For this reason, in consideration of iron loss characteristics of the electrical steel sheets 40, the thicknesses of the electrical steel sheets 40 are preferably 0.35 mm or smaller and more preferably 0.20 mm or 0.25 mm.

In consideration of the foregoing points, for example, the thickness of each of the electrical steel sheets 40 is within a range of 0.10 mm to 0.65 mm, preferably within a range of 0.10 mm to 0.35 mm, and more preferably 0.20 mm or 0.25 mm. The thicknesses of the electrical steel sheets 40 also include the thicknesses of the insulation coatings.

Some of the plurality of electrical steel sheets 40 forming the stator core 21 are adhered to each other via adhesion parts 41. The adhesion parts 41 are adhesives provided between the electrical steel sheets 40 adjacent to each other in a stacking direction and cured without being divided. For example, thermosetting type adhesives for polymer bonding or the like are used as adhesives. A composition including (1) an acrylic-based resin, (2) an epoxy-based resin, (3) an acrylic-based resin and an epoxy-based resin, or the like can be applied as a composition of the adhesives. In addition to thermosetting type adhesives, radical polymerization type adhesives or the like can be used as such adhesives. From a viewpoint of productivity, it is desirable to use room temperature curing type adhesives. Room temperature curing type adhesives are cured at a temperature within a range of 20° C. to 30° C. Acrylic-based adhesives are preferable as room temperature curing type adhesive. Representative acrylic-based adhesives include second generation acrylic adhesives (SGA) and the like. Within a range not imparting the effects of the present invention, any of anaerobic adhesives, instant adhesives, and elastomer-containing acrylic-based adhesives can be used. The aforementioned adhesives denote adhesives in a state before being cured, and the adhesives become the adhesion parts 41 after being cured.

An average tensile modulus of elasticity E of the adhesion parts 41 at room temperature (20° C. to 30° C.) is set within a range of 1,500 MPa to 4,500 MPa. If the average tensile modulus of elasticity E of the adhesion parts 41 is lower than 1,500 MPa, a problem of a low rigidity of the laminated core occurs. For this reason, a lower limit value for the average tensile modulus of elasticity E of the adhesion parts 41 is set to 1,500 MPa and more preferably 1,800 MPa. In contrast, if the average tensile modulus of elasticity E of the adhesion parts 41 exceeds 4,500 MPa, a problem of peeling of the insulation coatings formed on front surfaces of the electrical steel sheets 40 occurs. For this reason, an upper limit value for the average tensile modulus of elasticity E of the adhesion parts 41 is set to 4,500 MPa and more preferably 3,650 MPa.

The average tensile modulus of elasticity E is measured by a resonance method. Specifically, the tensile modulus of elasticity is measured in conformity to JIS R 1602:1995.

More specifically, first, samples (not illustrated) for measurement are produced. The samples are obtained by adhering two electrical steel sheets 40 to each other using an adhesive (measurement target) and forming the cured adhesion part 41. The adhesion part 41 is cured by performing heating and pressurizing under heating and pressurizing conditions during actual operation when the adhesive is a thermosetting type adhesive. On the other hand, the adhesion part 41 is cured by performing pressurizing at room temperature when the adhesive is a room temperature curing type adhesive.

Further, the tensile moduli of elasticity of the samples are measured by a resonance method. A method of measuring the tensile modulus of elasticity by the resonance method is performed in conformity to JIS R 1602:1995 as described above. Thereafter, the tensile modulus of elasticity of the single adhesion part 41 is obtained by removing the influence of the electrical steel sheet 40 itself from the tensile modulus of elasticity (measurement value) of the sample through calculation.

The tensile moduli of elasticity obtained in this manner from the samples become equivalent to an average value in the entire laminated core, and thus this numerical value is regarded as the average tensile modulus of elasticity E. The composition is set such that the average tensile modulus of elasticity E seldom varies at stacking positions in the stacking direction thereof or at positions in the circumferential direction around the center axis of the laminated core. For this reason, the value of the average tensile modulus of elasticity E can also be a numerical value obtained by measuring the cured adhesion part 41 at an upper end position in the laminated core.

For example, a method in which an adhesive is applied to the electrical steel sheets 40 and then they are adhered to each other through any of or both heating and press-stacking can be employed as an adhesion method. For example, any method may be adopted as heating, such as heating inside a high temperature bath or an electric furnace or a method of direct electrification.

In order to stably obtain a sufficient adhesion strength, it is preferable that the thicknesses of the adhesion parts 41 be 1 μm or larger.

On the other hand, if the thicknesses of the adhesion parts 41 exceed 100 μm, an adhesion force saturates. In addition, the space factor decreases as the adhesion parts 41 become thicker, and a torque density when the laminated core is applied to a motor decreases. Therefore, the thicknesses of the adhesion parts 41 are preferably within a range of 1 μm to 100 μm and more preferably within a range of 1 μm to 10 μm.

In the foregoing description, the thicknesses of the adhesion parts 41 denote the average thickness of the adhesion parts 41.

It is more preferable that the average thickness of the adhesion parts 41 be within a range of 1.0 μm to 3.0 μm. If the average thickness of the adhesion parts 41 is smaller than 1.0 μm, a sufficient adhesion force described above cannot be ensured. For this reason, a lower limit value for the average thickness of the adhesion parts 41 is set to 1.0 μm and more preferably 1.2 μm. In contrast, if the average thickness of the adhesion parts 41 becomes thick exceeding 3.0 μm, a problem such as drastic increase in strain amounts of the electrical steel sheets 40 due to shrinkage at the time of thermosetting occurs. For this reason, an upper limit value for the average thickness of the adhesion parts 41 is set to 3.0 μm and more preferably 2.6 μm.

The average thickness of the adhesion parts 41 is an average value of the entire laminated core. The average thickness of the adhesion parts 41 seldom varies at stacking positions in the stacking direction thereof or at positions in the circumferential direction around the center axis of the laminated core. For this reason, the value of the average thickness of the adhesion parts 41 can be the average value of numerical values measured at ten or more places at the upper end position in the laminated core in the circumferential direction.

For example, the average thickness of the adhesion parts 41 can be adjusted by varying an applying amount the adhesive. In addition, for example, in a case of a thermosetting type adhesive, the average tensile modulus of elasticity E of the adhesion parts 41 can be adjusted by changing one or both heating and pressurizing conditions applied at the time of adhesion and the kind of a curing agent, or the like.

In the present embodiment, the plurality of electrical steel sheets 40 forming the rotor core 31 are fixed to each other using a fastening C (dowel). However, the plurality of electrical steel sheets 40 forming the rotor core 31 may be adhered to each other via the adhesion parts 41.

A laminated core such as the stator core 21 or the rotor core 31 may be formed through so-called turn-stacking.

Figure 3:
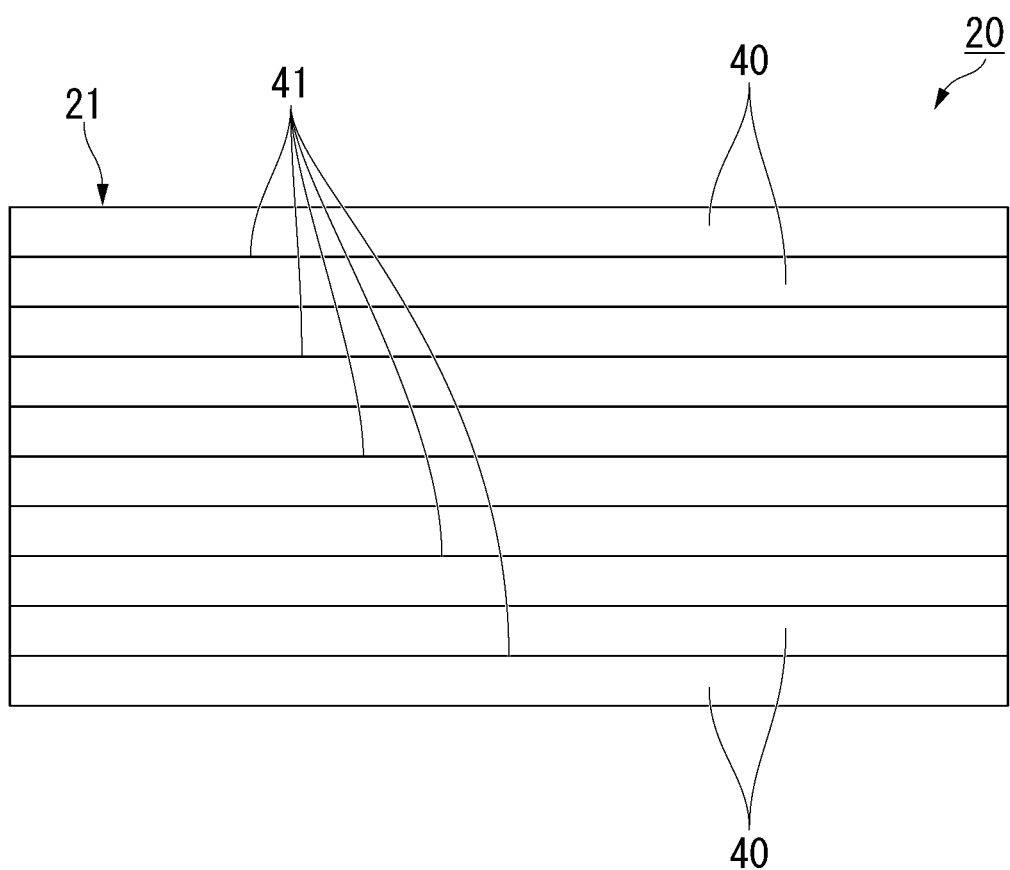
FIG. 3 is a side view of the stator included in the electric motor illustrated in FIG. 1.
Figure 4:
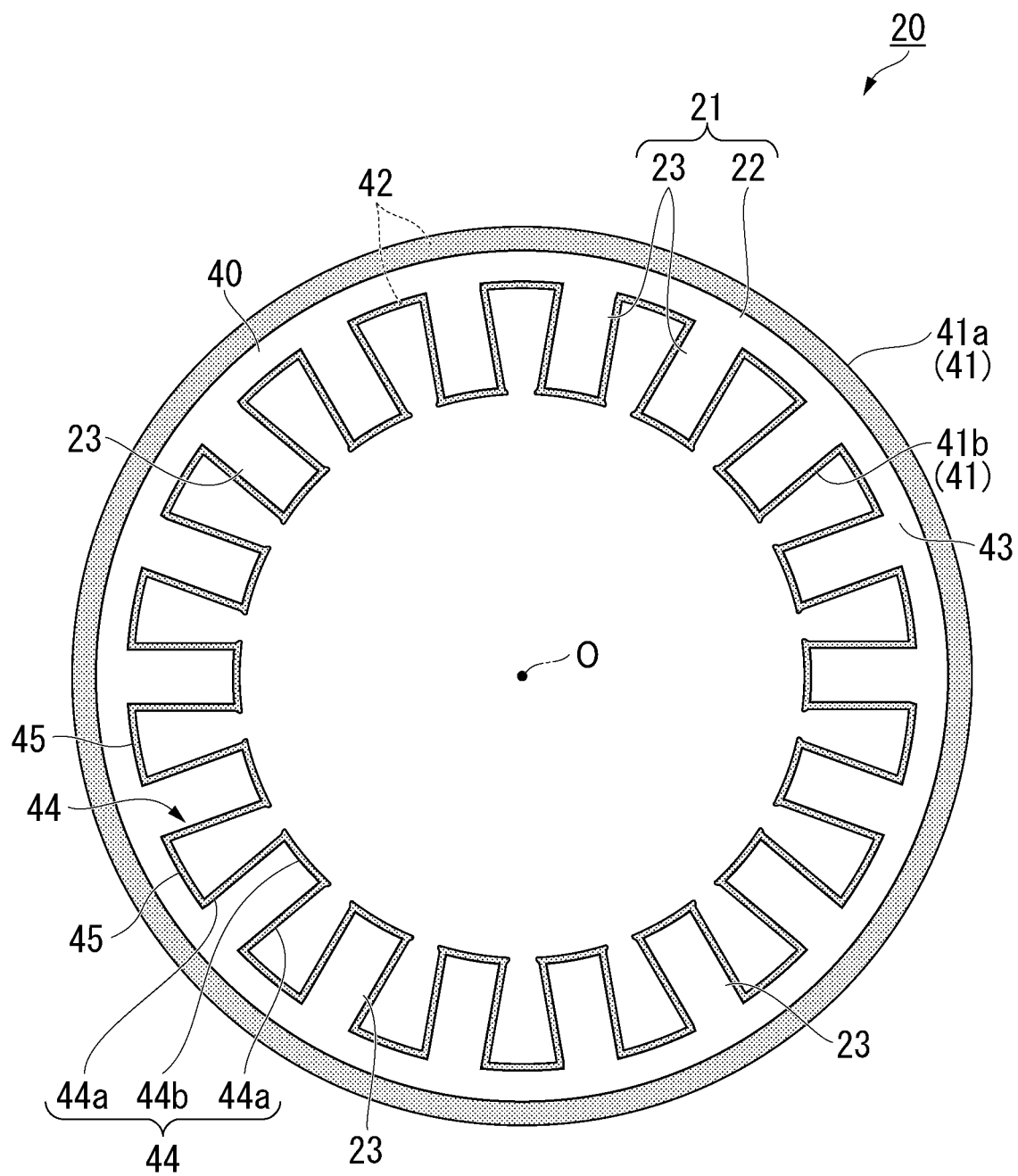
FIG. 4 is a plan view of an electrical steel sheet and an adhesion part of the stator included in the electric motor illustrated in FIG. 1.

Here, as illustrated in FIGS. 3 and 4, in the stator core 21 of the present embodiment, all sets of the electrical steel sheets 40 adjacent to each other in the stacking direction are fixed by any of adhesion and fastening. Some sets of the electrical steel sheets 40 among all sets of the electrical steel sheets 40 are fastened but not adhered to each other, and the remaining sets of electrical steel sheets 40 are adhered but not fastened to each other.

In the present embodiment, the plurality of electrical steel sheets 40 are adhered every other or more sets in the stacking direction, specifically every prime-numbered sets (at least in this specification, the prime number includes 1), and more specifically every other set. In other words, when the plurality of electrical steel sheets 40 are adhered every N sets in the stacking direction. N is a natural number, specifically N is a prime number, and more specifically N is 1. That is, the plurality of electrical steel sheets 40 are adhered every other set in the stacking direction and fastened every other set. In other words, the plurality of electrical steel sheets 40 are alternately bonded in the stacking direction by fastening and adhesion. Namely, as illustrated in FIG. 3, the adhesion parts 41 are not disposed between all sets but are disposed every other set. In addition, in the electrical steel sheet 40 interposed between a pair of electrical steel sheets 40 in the stacking direction, the electrical steel sheet 40 is fastened to one of the pair of electrical steel sheets 40 and is adhered to the other.

Here, adhering the plurality of electrical steel sheets 40 every N sets in the stacking direction denotes that the electrical steel sheets 40 of N sets (N+1 sheets) are disposed between a pair of adhesion parts 41 disposed away from each other in the stacking direction. When N is 1, the electrical steel sheets 40 of one set (two sheets) are disposed between the pair of adhesion parts 41. When N is 2, the electrical steel sheets 40 of two sets (three sheets) are disposed between the pair of adhesion parts 41.

Figure 7:
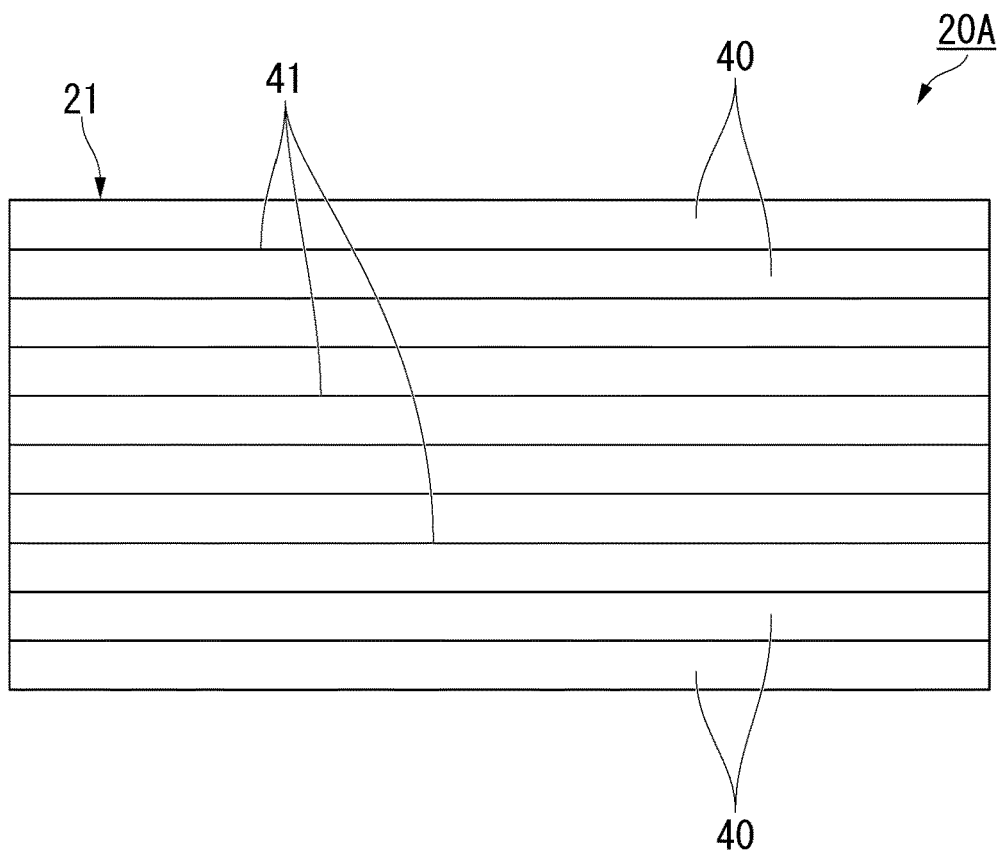
FIG. 7 is a side view of a stator included in a first modification example of the electric motor illustrated in FIG. 1.
Figure 8:
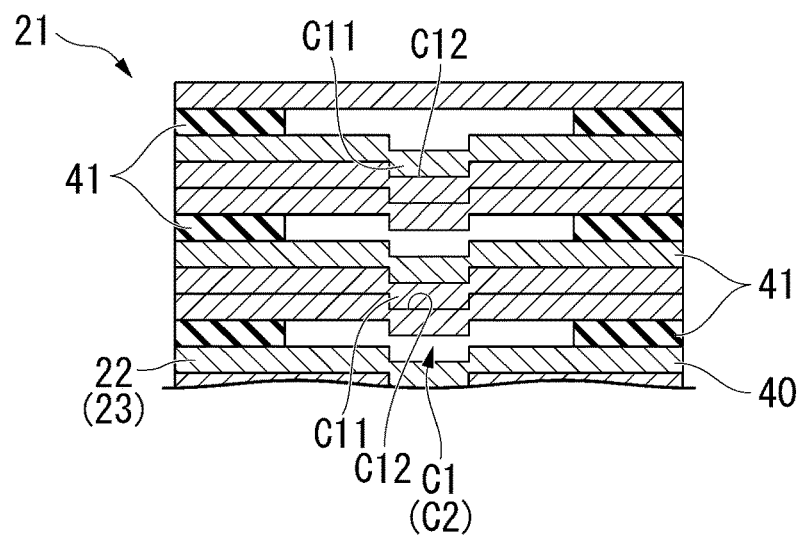
FIG. 8 is a cross-sectional view of the stator illustrated in FIG. 7 and is a cross-sectional view corresponding to that in FIG. 6.
Figure 9:
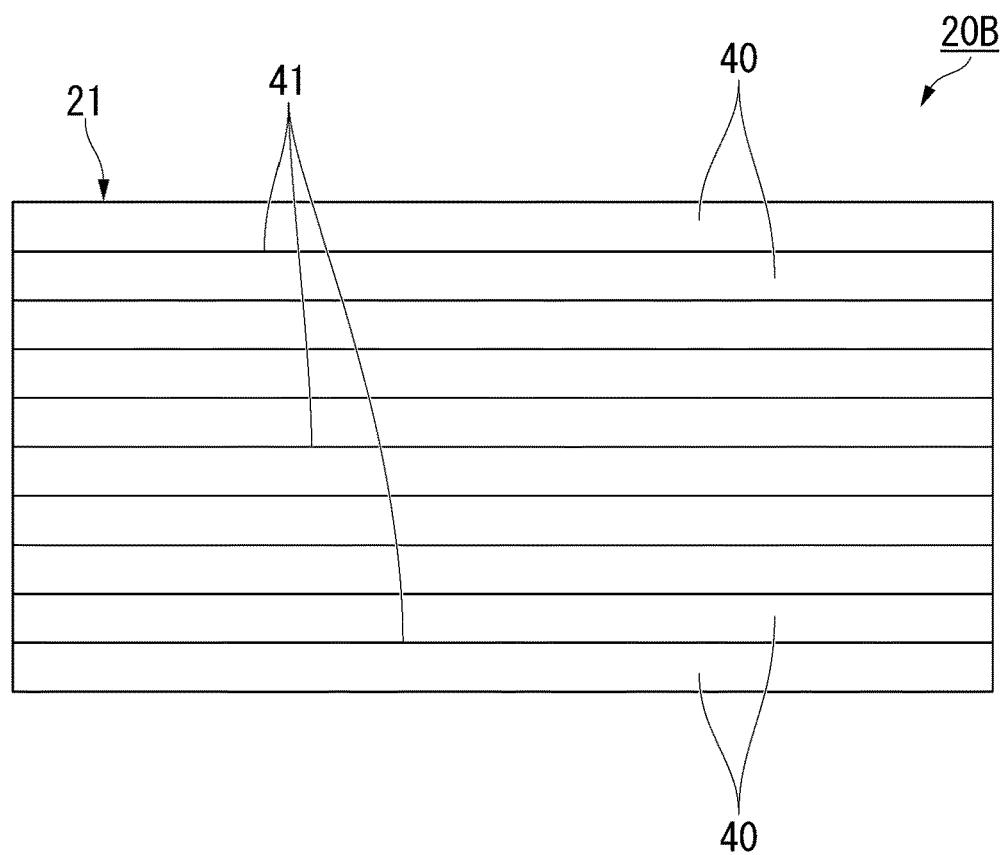
FIG. 9 is a side view of a stator included in a second modification example of the electric motor illustrated in FIG. 1.

The present invention is not limited thereto. As in stators 20A and 20B according to each of modification examples illustrated in FIGS. 7 and 8 or FIG. 9, the plurality of electrical steel sheets 40 may be adhered every two sets (every three sheets) or every three sets (every four sheets) in the stacking direction. In other words, the adhesion parts 41 may be provided every two sets or every three sets in the stacking direction. In these cases, the electrical steel sheets 40 which are not adhered are fastened to each other. Consequently, in all sets of the electrical steel sheets 40, the number of sets of the electrical steel sheets 40 bonded by fastening is larger than the number of sets of the electrical steel sheets 40 bonded by adhesions.

Moreover, the present invention is not limited thereto. As in a stator 20C according to the modification example illustrated in FIG. 10, portions adhered to each other every different numbered sets in the stacking direction may be present in a mixed manner in the plurality of electrical steel sheets 40. In other words, in the plurality of electrical steel sheets 40, portions adhered every first numbered sets in the stacking direction and portions adhered every second numbered sets in the stacking direction may be present in a mixed manner. In the modification example illustrated FIG. 10, in the plurality of electrical steel sheets 40, portions adhered every other set (every two sheets) in the stacking direction and portions adhered every two sets (every three sheets) in the stacking direction are present in a mixed manner. That is, the plurality of electrical steel sheets 40 are adhered to each other every different prime-numbered sets in the stacking direction. Sets which are not adhered are bonded by fastening. Here, in this modification example, the electrical steel sheets 40 are adhered every two sets after being adhered every other set in the stacking direction and adhered every two sets after being adhered every other set. In other words, the plurality of electrical steel sheets 40 are alternately adhered every other set (every first numbered sets) and every two sets (every second numbered sets) in the stacking direction.

In this modification example, in place of every other set and every two sets, the electrical steel sheets 40 may be adhered every numbered sets such as every three or more sets.

In addition, the plurality of electrical steel sheets 40 may not be alternately adhered every first numbered sets and every second numbered sets in the stacking direction. For example, the electrical steel sheets 40 adhered every first numbered sets and the electrical steel sheets 40 adhered every second numbered sets may be irregularly disposed.

Moreover, the plurality of electrical steel sheets 40 may not be alternately adhered every numbered sets of two kinds such as every first numbered sets and every second numbered sets in the stacking direction. That is, they may be alternately adhered every numbered sets of three or more kinds.

As illustrated in FIG. 4, the electrical steel sheets 40 which are adjacent to each other in the stacking direction and adhered to each other via the adhesion parts 41 are not adhered to each other throughout the whole surface. These electrical steel sheets 40 are locally adhered to each other.

In the present embodiment, the electrical steel sheets 40 adjacent to each other in the stacking direction are adhered via the adhesion parts 41 provided along circumferential edges of the electrical steel sheets 40. Specifically, the electrical steel sheets 40 adjacent to each other in the stacking direction are adhered to each other via first adhesion parts 41a and second adhesion parts 41b. The first adhesion parts 41a are provided along outer circumferential edges of the electrical steel sheets 40 in a plan view in which the electrical steel sheets 40 are viewed in the stacking direction. The second adhesion parts 41b are provided along inner circumferential edges of the electrical steel sheets 40 in a plan view in which the electrical steel sheets 40 are viewed in the stacking direction. Each of the first and second adhesion parts 41a and 41b is formed to have a strip shape in a plan view.

Here, a strip shape also includes a shape in which a width of a strip varies in the middle. For example, a shape in which a circular point continues in one direction without being divided is also included in a strip shape extending in one direction. In addition, being along the circumferential edge includes not only a case of being completely parallel to the circumferential edge but also a case of having an inclination within five degrees, for example, with respect to the circumferential edge.

The first adhesion parts 41a are disposed along the outer circumferential edges of the electrical steel sheets 40. The first adhesion parts 41a continuously extend throughout the whole circumference in the circumferential direction. The first adhesion parts 41a are formed to have an annular ring shape in a plan view in which these first adhesion parts 41a are viewed in the stacking direction.

The second adhesion parts 41b are disposed along the inner circumferential edges of the electrical steel sheets 40. The second adhesion parts 41b continuously extend throughout the whole circumference in the circumferential direction.

The second adhesion parts 41b include a plurality of tooth portions 44 and a plurality of core back portions 45. The plurality of tooth portions 44 are provided at intervals in the circumferential direction and disposed in the respective tooth parts 23. The plurality of core back portions 45 are disposed in the core back part 22 and join the tooth portions 44 adjacent to each other in the circumferential direction to each other.

The tooth portion 44 includes a pair of first portions 44*a* and a second portion 44*b*. The first portions 44*a* are disposed at intervals in the circumferential direction. The first portions 44*a* extend in the radial direction. The first portions 44*a* extend in a strip shape in the radial direction. The second portion 44*b* joins the pair of first portions 44*a* to each other in the circumferential direction. The second portion 44*b* extends in a strip shape in the circumferential direction.

In the present embodiment, the shapes of all the adhesion parts 41 provided between the electrical steel sheets 40 in a plan view are the same. The shapes of the adhesion parts 41 in a plan view denote the entire shapes of the adhesion parts 41 in a plan view in which the electrical steel sheets 40 provided with the adhesion parts 41 are viewed in the stacking direction. Having the same shapes of all the adhesion parts 41 provided between the electrical steel sheets 40 in a plan view includes not only a case in which the shapes of all the adhesion parts 41 provided between the electrical steel sheets 40 in a plan view are completely the same but also include a case in which they are substantially the same. The case of being substantially the same indicates a case in which the shapes of all the adhesion parts 41 provided between the electrical steel sheets 40 in a plan view are in common in portions of 95% or more.

Further, in the present embodiment, an adhesion area ratio of the electrical steel sheets 40 via the adhesion parts 41 is within a range of 1% to 40%. In the illustrated example, the adhesion area ratio is within a range of 1% to 20% and specifically 20%. The adhesion area ratio of the electrical steel sheets 40 via the adhesion parts 41 is a ratio of a surface area of a region in which the adhesion parts 41 are provided (adhesion region 42) on a surface directed in the stacking direction (which will hereinafter be referred to as a first surface of the electrical steel sheets 40) to a surface area of the first surface in the electrical steel sheets 40. A region in which the adhesion parts 41 are provided indicates a region in which an adhesive cured without being divided is provided (adhesion region 42) on the first surface of the electrical steel sheets 40. For example, the surface area of the region in which the adhesion parts 41 are provided is obtained by capturing an image of the first surface of the electrical steel sheets 40 after peeling and performing image analysis of results of the captured image.

In the present embodiment, the adhesion area ratio of the electrical steel sheets 40 via the adhesion parts 41 between the electrical steel sheets 40 is within a range of 1% to 20%. In both the electrical steel sheets 40 adjacent to each other in the stacking direction, both the adhesion area ratios of the electrical steel sheets 40 via the adhesion parts 41 are within a range of 1% to 20%. When the adhesion parts 41 are provided on both sides in the stacking direction with respect to one electrical steel sheet 40, both the adhesion area ratios of both surfaces of the electrical steel sheet 40 are within a range of 1% to 20%.

Compared to a case in which the electrical steel sheets 40 are fastened, an adhesion area (bonded area) can be easily ensured by adhering the electrical steel sheets 40 via the adhesion parts 41.

Figure 5:
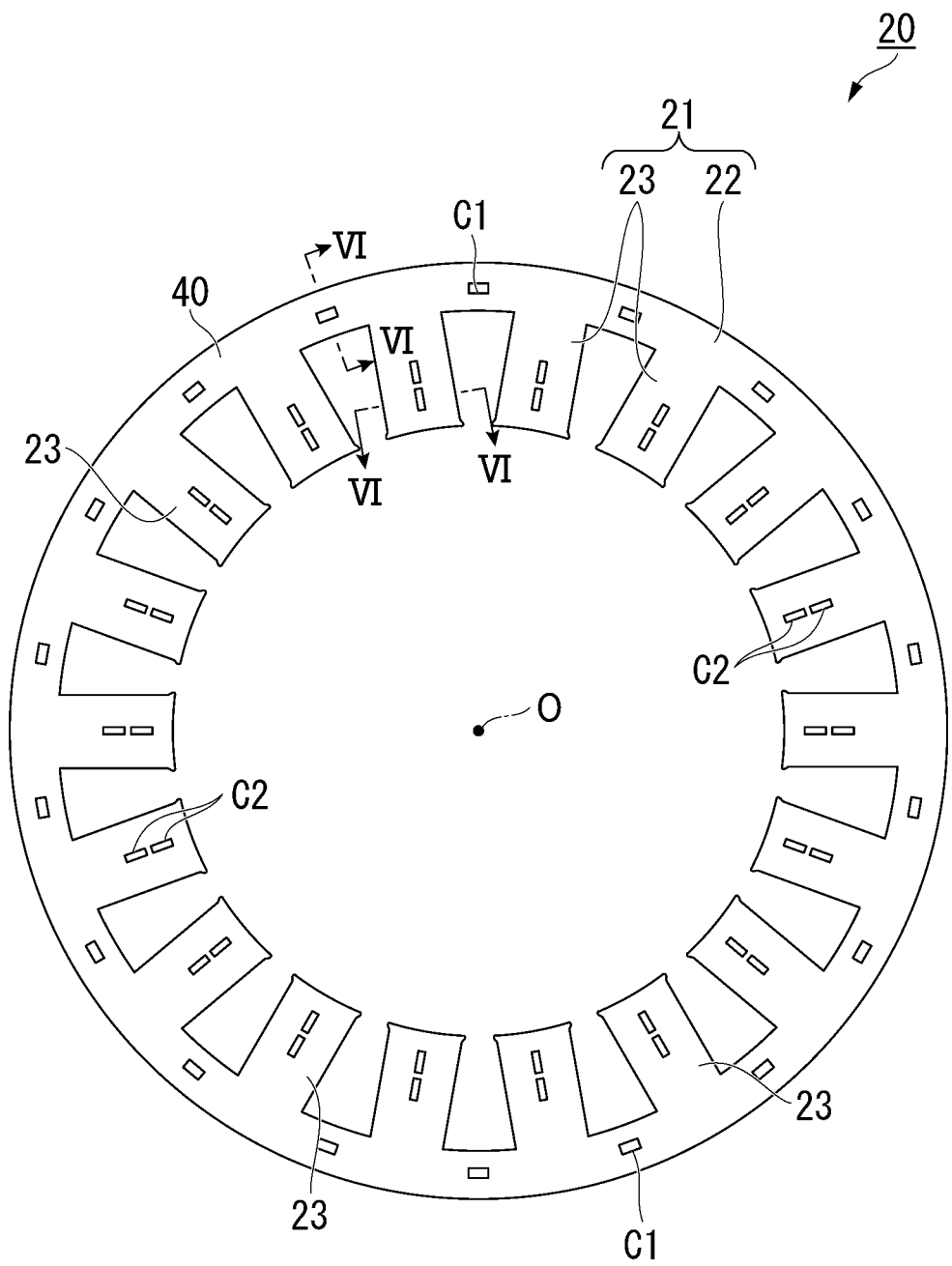
FIG. 5 is a plan view of the electrical steel sheet and fastening of the stator included in the electric motor illustrated in FIG. 1.

As illustrated in FIG. 5, fastenings C1 and C2 are formed in the electrical steel sheets 40 fastened to each other. The fastenings C1 and C2 include first fastenings C1 provided in the core back part 22 and second fastenings C2 provided in the tooth parts 23.

A plurality of first fastenings C1 are disposed at equal intervals in the circumferential direction. In the illustrated example, the first fastenings C1 are disposed alternately with the tooth parts 23 in the circumferential direction. The first fastenings C1 are disposed between the tooth parts 23 adjacent to each other in the circumferential direction. The first fastenings C1 are disposed at the center of the core back part 22 in the radial direction.

The second fastenings C2 are provided in all of the tooth parts 23. The second fastenings C2 are disposed at the center of the respective tooth parts 23 in the circumferential direction. Two second fastenings C2 are disposed side by side in each of the tooth parts 23 in the radial direction.

Figure 6:
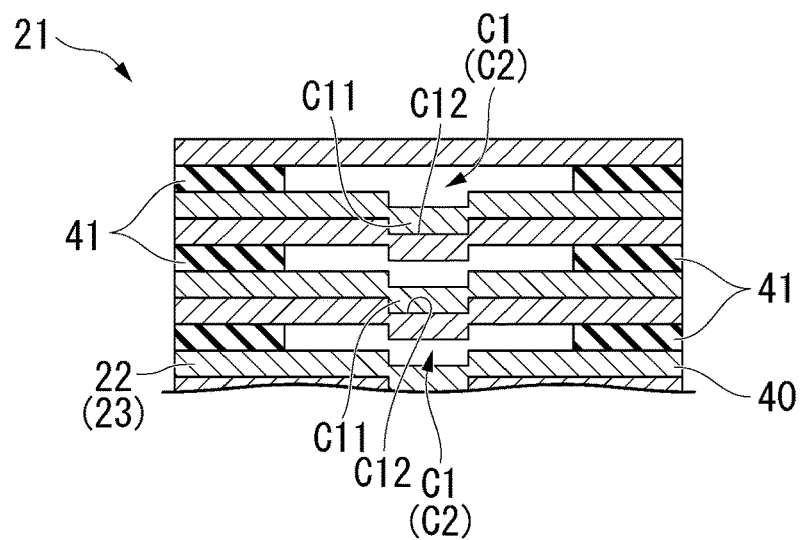
FIG. 6 is a cross-sectional view taken along arrow VI-VI illustrated in FIG. 5.

As illustrated in FIG. 6, the first fastening C1 includes projected parts C11 and recessed parts C12 provided in the respective electrical steel sheets 40. The projected parts C11 protrude from the electrical steel sheets 40 in the stacking direction. The recessed parts C12 are disposed in portions positioned on rear sides of the projected parts C11 in the respective electrical steel sheets 40. The recessed parts C12 are hollow in the stacking direction with respect to the front surfaces (first surfaces) of the electrical steel sheets 40. The projected parts C11 and the recessed parts C12 are formed by pressing each of the electrical steel sheets 40, for example.

Here, one of two electrical steel sheets 40 fastened to each other will be referred to as a first electrical steel sheet 40, and the other will be referred to as a second electrical steel sheet 40. The first fastenings C1 are formed by causing the projected parts C11 of the first electrical steel sheet 40 to be fitted into the recessed parts C12 of the second electrical steel sheet 40. When the projected parts C11 are fitted into the recessed parts C12 and the first fastenings C1 are formed, relative displacement between two electrical steel sheets 40 adjacent to each other in the stacking direction is restricted.

The second fastenings C2 have a constitution similar to that of the first fastenings C1. The second fastening C2 includes the projected parts C11 and the recessed parts C12 provided in the respective electrical steel sheets 40. The second fastenings C2 are formed when the projected parts C11 of the first electrical steel sheet 40 are fitted into the recessed parts C12 of the second electrical steel sheet 40. When the projected parts C11 are fitted into the recessed parts C12 and the second fastenings C2 are formed, relative displacement between two electrical steel sheets 40 adjacent to each other in the stacking direction is restricted.

The shapes of the projected parts C11 and the recessed parts C12 are not particularly limited. For example, through holes may be provided as the recessed parts C12 in the electrical steel sheets 40.

In addition, a direction in which the projected parts C11 protrude and a direction in which the recessed parts C12 are hollow may be directed to any of a first side D1 and a second side D2 in the stacking direction.

In the present embodiment, the fastenings C1 and C2 and the adhesion parts 41 do not overlap each other in a plan view and are disposed at positions avoiding each other. The fastenings C1 and C2 and the adhesion parts 41 are alternately disposed in a plan view. The sum of the surface areas of the fastenings C1 and C2 in a plan view is smaller than the sum of the surface areas of the adhesion parts 41.

In addition, in the present embodiment, the electrical steel sheets 40 fastened to each other are not adhered. In other words, the adhesion parts 41 are not provided between the electrical steel sheets 40 fastened to each other.

Moreover, in the present embodiment, the electrical steel sheets 40 adhered to each other are not fastened. In other words, in the electrical steel sheets 40 adhered to each other, the projected parts C11 and the recessed parts C12 are not fitted to each other. That is, restriction of relative displacement between the electrical steel sheets 40 adhered to each other is not realized by at least fitting between the projected parts C11 and the recessed parts C12.

Compared to bonding by adhesion, bonding by fastening can enhance dimensional accuracy. Here, some sets of the electrical steel sheets 40 among all sets of the electrical steel sheets adjacent to each other in the stacking direction are fastened to each other. Therefore, in the stator core 21, accuracy of the shapes of portions formed by some sets thereof can be enhanced. As a result, accuracy of the external shape of the stator core 21 can be enhanced. Thus, handling properties of the stator core 21 can be ensured. For example, even when a winding is wound around the stator core 21, winding or the like can be accurately performed.

In the present embodiment, when a winding is caused to pass through a slot between the tooth parts 23 adjacent to each other in the circumferential direction, operational effects of ensuring handling properties described above are noticeably exhibited. That is, if the dimensional accuracy of the slot is increased, the winding can be easily wound around the tooth parts 23 as it is designed. Accordingly, a winding space factor in the slot can be enhanced. As a result, an electric loading inside the slot can be enhanced.

However, in bonding by fastening, there is concern that a short circuit current (stray current) may be generated between the electrical steel sheets 40 adjacent to each other in the stacking direction. Here, the remaining sets of the electrical steel sheets 40 among all sets of the electrical steel sheets 40 adjacent to each other in the stacking direction excluding some sets thereof are adhered to each other. Therefore, generation of a stray current can be curbed between the remaining sets of the electrical steel sheets 40. As a result, magnetic properties of the stator core 21 can be improved.

The plurality of electrical steel sheets 40 are adhered every other or more sets (in the present embodiment, every other set) in the stacking direction. Therefore, local concentration of the electrical steel sheets 40 bonded by adhesion in one portion of the stator core 21 in the stacking direction can be curbed. In other words, the electrical steel sheets 40 bonded by adhesion can be dispersed in the stacking direction. As a result, accuracy of the external shape of the stator core 21 can be further enhanced.

Incidentally, similar to ordinary products, the stator core 21 also has a unique resonance frequency. If the resonance frequency of the stator core 21 is low, resonance is likely to occur when an ordinary vibration is input. For this reason, it is preferable that the resonance frequency of the stator core 21 be high.

Here, when the plurality of electrical steel sheets 40 are adhered every N sets in the stacking direction, the resonance frequency of the stator core 21 tends to depend on N.

That is, when they are adhered every N sets, (N+1) electrical steel sheets 40 are disposed between the adhesion parts 41 adjacent to each other in the stacking direction, and these electrical steel sheets 40 are fastened to each other. When a bonding strength of the adhesion parts 41 is lower than a bonding strength of fastening, the (N+1) electrical steel sheets 40 are likely to integrally behave with the adhesion parts 41 as starting points. In other words, the (N+1) electrical steel sheets 40 behave as if they were one block. In such a stator core 21, when the plurality of electrical steel sheets 40 are adhered every N sets at equal intervals in the stacking direction, the resonance frequency of the stator core 21 is affected by a divisor of N. In addition, when the plurality of electrical steel sheets 40 are adhered every N1 sets, every N2 sets, and so on in the stacking direction in a manner of being different from each other, the resonance frequency of the stator core 21 is affected by the least common multiple of N1, N2, and so on. The larger the divisor or the least common multiple, the higher the resonance frequency of the stator core 21.

The plurality of electrical steel sheets 40 are adhered every prime-numbered sets (in the present embodiment, every other set) in the stacking direction. For this reason, even when the plurality of electrical steel sheets 40 are adhered every N sets (herein, N is a prime number) at equal intervals in the stacking direction, N is a prime number, and thus the divisor can be increased. Moreover, also when the plurality of electrical steel sheets 40 are adhered every N1 sets, every N2 sets, and so on in the stacking direction in a manner of being different from each other, the least common multiple of N1, N2, and so on can be increased. Therefore, the resonance frequency of the stator core 21 can be increased. As a result, for example, the resonance frequency can become a frequency higher than that in an audible range. Accordingly, for example, as in the present embodiment, even when this stator core 21 is applied to a motor, occurrence of noise due to resonance can be curbed.

Figure 10:
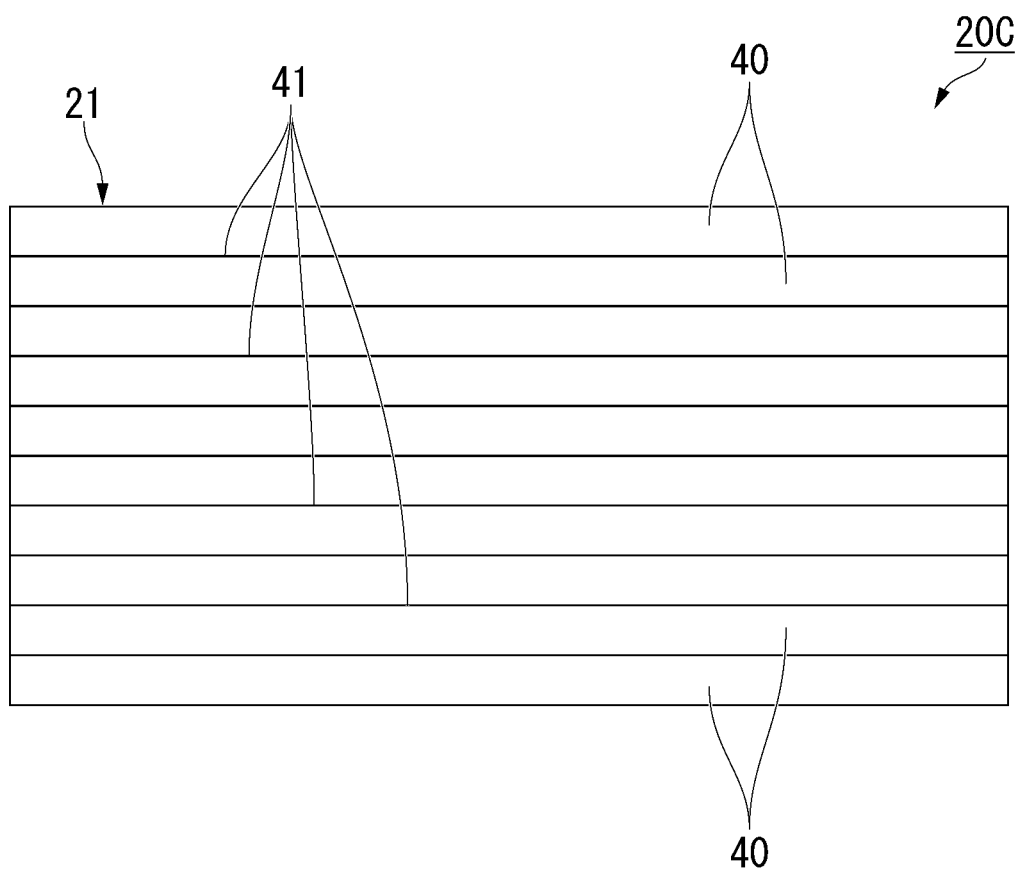
FIG. 10 is a side view of a stator included in a third modification example of the electric motor illustrated in FIG. 1.

In the modification example illustrated in FIG. 10, portions adhered to each other every different numbered sets in the stacking direction are present in a mixed manner in the plurality of electrical steel sheets 40. For this reason, when the plurality of electrical steel sheets 40 are adhered every N1 sets, every N2 sets, and so on in the stacking direction in a manner of being different from each other, the least common multiple of N1, N2, and so on can be increased. Therefore, the resonance frequency of the stator core 21 can be increased in accordance with the least common multiple of the numbers of sets thereof. Accordingly, occurrence of noise due to resonance can be further curbed.

As in the foregoing example, such operational effects are noticeably exhibited when they are adhered to each other every different prime-numbered sets in the stacking direction. That is, in this case, the least common multiple can be increased.

The technical scope of the present invention is not limited to the embodiment, and various changes can be applied within a range not departing from the gist of the present invention.

The shape of the stator core is not limited to the forms described in the embodiment. Specifically, the dimensions of the outer diameter and the inner diameter of the stator core, the stacking thickness, the number of slots, the dimensional ratio of the tooth part 23 in the radial direction to the circumferential direction, the dimensional ratio of the core back part 22 to the tooth parts 23 in the radial direction, and the like can be arbitrarily designed in accordance with the characteristics of a desired electric motor.

In the rotor according to the embodiment, two permanent magnets 32 in one set form one magnetic pole, but the present invention is not limited thereto. For example, one permanent magnet 32 may form one magnetic pole, or three or more permanent magnets 32 may form one magnetic pole.

In the embodiment, a permanent magnetic electric motor has been described as an example of an electric motor, but the structure of the electric motor is not limited thereto as described below as an example. Moreover, various known structures which are not described below as an example can also be employed.

In the embodiment, a permanent magnetic electric motor has been described as an example of a synchronous motor, but the present invention is not limited thereto. For example, the electric motor may be a reluctance motor or an electromagnet field motor (wound-field motor).

In the embodiment, a synchronous motor has been described as an example of an AC motor, but the present invention is not limited thereto. For example, the electric motor may be an induction motor.

In the embodiment, an AC motor has been described as an example of a motor, but the present invention is not limited thereto. For example, the electric motor may be a DC motor.

In the embodiment, a motor has been described as an example of as an electric motor, but the present invention is not limited thereto. For example, the electric motor may be a generator.

In the embodiment, a case in which the laminated core according to the present invention is applied to a stator core has been described as an example, but it can also be applied to a rotor core.

Furthermore, the constituent elements in the embodiment can be suitably replaced with known constituent elements within a range not departing from the gist of the present invention. In addition, the modification examples may be suitably combined.

Next, a verification test for verifying the foregoing operational effects was performed. This verification test was performed in simulations using software. An electromagnetic field simulation software based on finite element method JMAG manufactured by JSOL Corporation was utilized as the software.

A first verification test and a second verification test were performed as the verification test.

(First Verification Test)

In the first verification test, operational effects based on a mixture of fastening and adhesion were verified.

In this verification test, simulations were performed for stators of comparative examples 1 and 2 and stators of examples 1 to 3.

In all the stators of the comparative examples 1 and 2 and the stators of the examples 1 to 3 in common, the foregoing stator 20 according to the embodiment illustrated in FIGS. 1 to 6 was adopted as a basic structure, and the following points were changed in this stator 20. That is, sheet thicknesses of electrical steel sheets were set to 0.20 mm, a stacking thickness of a laminated core was set to 50 mm, the number of electrical steel sheets was set to 250.

Then, in the stator of the comparative examples 1, all the layers of the 250 electrical steel sheets were bonded by fastening. In the stator of the comparative example 2, all the layers of the 250 electrical steel sheets were bonded by adhesion. In the stator of the example 1, 250 electrical steel sheets were bonded every other set in the stacking direction by adhesion, and the remaining electrical steel sheets were bonded by fastening (they were alternately bonded by adhesion and fastening). In the stator of the example 2, 250 electrical steel sheets were bonded every two sets in the stacking direction by adhesion, and the remaining electrical steel sheets were bonded by fastening. In the stator of the example 3, in 250 electrical steel sheets, 125 electrical steel sheets on one side in the stacking direction were bonded by adhesion, and the 125 remaining electrical steel sheets were bonded by fastening.

In each of the stators of the comparative examples 1 and 2 and the examples 1 to 3, an iron loss for one electrical steel sheet and the dimensional accuracy as a stator core were checked. An iron loss was calculated through simulations utilizing the foregoing software. The dimensional accuracy was evaluated based on the size of deviation from an aimed dimension in a case in which five stator cores were manufactured for each example.

The following table 1 shows the results.

TABLE 1

| | Comparative example 1 | Example 1 | Example 2 | Example 3 | Comparative example 2 |
|---|---|---|---|---|---|
| Bonding method | Fastening for all layers | Fastening and adhesion every other set | Adhesion every two sets and fastening for the remaining sheets | Fastening for the half and adhesion for another half | Adhesion for all layers |
| Stray current | Short circuit generated | Slight short circuit | Slight short circuit | Slight short circuit | Short circuit avoided |
| Dimensional accuracy | Excellent | Good | Allowable | Good | Poor |
| Iron loss (w/kg) | 25.2 | 23.4 | 24.0 | 23.5 | 21.6 |

From the above, in the example 1, compared to the comparative example 1, the improvement in an iron loss of 8.8% (=(25.2−23.4)/25.2) was observed, for example. Compared to the comparative example 1, the improvement in an iron loss was achieved in all of the examples 1 to 3, and it was also confirmed that there was slight generation of a stray current. Further, regarding the dimensional accuracy, a result that the examples 1 to 3 were more excellent than the comparative example 2 was obtained.

(Second Verification Test)

In the second verification test, the relationship between adhesion intervals and resonance was verified.

In this verification test, simulations were performed for stators of examples 11 to 21.

In all the stators of the examples 11 to 21 in common, the foregoing stator 20 according to the embodiment illustrated in FIGS. 1 to 6 was adopted as a basic structure, and the following points were changed in this stator 20. That is, the sheet thicknesses of the electrical steel sheets were set to 0.20 mm, the stacking thickness of the laminated core was set to 50 mm, the number of electrical steel sheets was set to 250.

Then, the stators of the examples 11 to 19 were set as follows.

In the stator of the example 11, 250 electrical steel sheets were bonded every other set in the stacking direction by adhesion, and the remaining electrical steel sheets were bonded by fastening (they were alternately bonded by adhesion and fastening).

In the stator of the example 12, 250 electrical steel sheets were bonded every two sets in the stacking direction by adhesion, the remaining electrical steel sheets were bonded by fastening.

Similarly, in the stators of the examples 13 to 19, in 250 electrical steel sheets, the interval for bonding by adhesion was incremented by one set in accordance with increment of the number of the example, such as every three sets, every four sets, and so on to every nine sets in the stacking direction.

In addition, the stators of the examples 20 and 21 were set as follows.

In the stator of the example 20, in 250 electrical steel sheets, portions adhered every three sets in the stacking direction and portions adhered every five sets in the stacking direction were mixed, and then sets which were not adhered were bonded by fastening.

In the stator of the example 21, in 250 electrical steel sheets, portions adhered every three sets in the stacking direction, portions adhered every five sets in the stacking direction, and portions adhered every seven sets in the stacking direction were mixed, and then sets which were not adhered were bonded by fastening.

Regarding these stators of the examples 11 to 19, it was checked whether or not a vibration within an audible range occurs at the time of resonance.

The following table 2 shows the results.

TABLE 2

| | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|
| Disposition of adhesion parts | Every other set | Every two sets | Every three sets | Every four sets | Every five sets | Every six sets | Every seven sets | Every eight sets | Every nine set | Every three sets and every five sets are mixed | Every three sets, every five sets, and every seven sets are mixed |
| Resonance | Weak in audible range | Weak in audible range | Weak in audible range | Strong in audible range | Weak in audible range | Strong in audible range | Weak in audible range | Strong in audible range | Strong in audible range | Extremely weak in audible range | Extremely weak in audible range |

From the above, in the stators of the examples 11, 12, 13, 15, and 17 (the stators in which the plurality of electrical steel sheets were adhered every prime-numbered sets in the stacking direction), it was confirmed that a vibration within an audible range was weak.

Moreover, in the stators of the examples 20 and 21 (the stators in which portions adhered to each other every different prime-numbered sets in the stacking direction were present in a mixed manner in the plurality of electrical steel sheets), it was confirmed that a vibration within an audible range was extremely weak.

INDUSTRIAL APPLICABILITY

According to the present invention, dimensional accuracy of an external shape can be ensured and magnetic properties can be improved. Thus, there is significant industrial applicability.

BRIEF DESCRIPTION OF THE REFERENCE SYMBOLS

10 Electric motor
21 Stator core (laminated core)
22 Core back part
23 Tooth part
40 Electrical steel sheet

The invention claimed is:

1. A laminated core comprising:
a plurality of electrical steel sheets that are stacked on one another,
wherein all sets of the electrical steel sheets adjacent to each other in a stacking direction are fixed to each other in the laminated core,
wherein some sets of electrical steel sheets among all sets of the electrical steel sheets are fastened but not adhered to each other, and the remaining sets of electrical steel sheets are adhered by adhesives but not fastened to each other, wherein the adhesives form adhesion parts between the electrical steel sheets,
wherein a first one sheet of the plurality of electrical steel sheets and a second one sheet of another electrical steel sheet, which are adjacent to each other in the stacking direction, are defined as one set of the electrical steel sheets,
wherein the plurality of electrical steel sheets are adhered every N sets in the stacking direction, and N+1 sheets of the electrical steel sheets are disposed between a pair of the adhesion parts disposed in the stacking direction,
wherein the plurality of electrical steel sheets are adhered every other or more sets in the stacking direction, and
wherein the plurality of electrical steel sheets are adhered every prime-numbered sets in the stacking direction.

2. The laminated core according to claim 1,
wherein portions adhered to each other every different numbered sets in the stacking direction are present in a mixed manner in the plurality of electrical steel sheets.

3. The laminated core according to claim 1,
wherein the electrical steel sheets include an annular core back part and a plurality of tooth parts protruding in a radial direction of the core back part from the core back part and disposed at intervals in a circumferential direction of the core back part.

4. The laminated core according to claim 1,
wherein an average thickness of the adhesion parts is within a range of 1.0 μm to 3.0 μm.

5. The laminated core according to claim 1,
wherein an average tensile modulus of elasticity E of the adhesion parts is within a range of 1,500 MPa to 4,500 MPa.

6. The laminated core according to claim 1,
wherein the adhesives of the adhesion parts are a room temperature adhesion type acrylic-based adhesive including an SGA including an elastomer-containing acrylic-based adhesive.

7. An electric motor comprising:
the laminated core according to claim 1.

8. A laminated core comprising:
a plurality of electrical steel sheets that are stacked on one another,
wherein all sets of the electrical steel sheets adjacent to each other in a stacking direction are fixed to each other in the laminated core,
wherein some sets of electrical steel sheets among all sets of the electrical steel sheets are fastened but not adhered to each other, and the remaining sets of electrical steel sheets are adhered by adhesives but not fastened to each other,
wherein the adhesives form adhesion parts between the electrical steel sheets,
wherein a first one sheet of the plurality of electrical steel sheets and a second one sheet of another electrical steel sheet, which are adjacent to each other in the stacking direction, are defined as one set of the electrical steel sheets,
wherein the plurality of electrical steel sheets are adhered every N sets in the stacking direction, and N+1 sheets of the electrical steel sheets are disposed between a pair of the adhesion parts disposed in the stacking direction,
wherein the plurality of electrical steel sheets are adhered every other or more sets in the stacking direction, and
wherein portions adhered to each other every different numbered sets in the stacking direction are present in a mixed manner in the plurality of electrical steel sheets.

9. The laminated core according to claim 8,
wherein the electrical steel sheets include an annular core back part and a plurality of tooth parts protruding in a radial direction of the core back part from the core back part and disposed at intervals in a circumferential direction of the core back part.

10. The laminated core according to claim 8,
wherein an average thickness of the adhesion parts is within a range of 1.0 μm to 3.0 μm.

11. The laminated core according to claim 8,
wherein an average tensile modulus of elasticity E of the adhesion parts is within a range of 1,500 MPa to 4,500 MPa.

12. The laminated core according to claim 8,
wherein the adhesives of the adhesion parts are a room temperature adhesion type acrylic-based adhesive including an SGA including an elastomer-containing acrylic-based adhesive.

13. An electric motor comprising:
the laminated core according to claim 8.

\* \* \* \* \*